United States Patent
Hsu (10) Patent No.: US 8,524,126 B2
(45) Date of Patent: Sep. 3, 2013

(54) METHOD FOR FORMING OPTICAL FILM

(71) Applicant: Chia-Ling Hsu, New Taipei (TW)

(72) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/650,111

(22) Filed: Oct. 11, 2012

(65) Prior Publication Data

US 2013/0032959 A1 Feb. 7, 2013

Related U.S. Application Data

(62) Division of application No. 12/975,247, filed on Dec. 21, 2010, now Pat. No. 8,297,962.

(30) Foreign Application Priority Data

Jul. 12, 2010 (TW) ................ 99122839 A (51) Int. Cl.
*B29D 11/00* (2006.01)
*B29C 35/08* (2006.01)
*B29C 59/04* (2006.01)

(52) U.S. Cl.
USPC ......... 264/1.34; 264/1.38; 264/410; 264/494; 264/495; 425/174.4; 425/385; 425/470

(58) Field of Classification Search
USPC ............... 264/1.34, 1.38, 405, 410, 494–496, 264/284; 425/174.4, 385, 403, 470, 818
See application file for complete search history.

(56) References Cited

U.S. PATENT DOCUMENTS

| 5,527,497 | A * | 6/1996 | Kanome et al. ............. 264/1.33 |
| 5,534,209 | A * | 7/1996 | Moriya .................... 264/171.13 |
| 5,540,147 | A * | 7/1996 | Johnson ........................ 101/211 |
| 6,077,065 | A * | 6/2000 | Sumiyoshi et al. ........... 425/368 |
| 6,272,275 | B1 * | 8/2001 | Cortright et al. ............. 385/129 |
| 7,147,453 | B2 * | 12/2006 | Boegli ........................ 425/363 |
| 2004/0219246 | A1 * | 11/2004 | Jeans ......................... 425/174.4 |
| 2005/0127541 | A1 * | 6/2005 | Spurgeon et al. ............ 264/1.34 |
| 2006/0138693 | A1 * | 6/2006 | Tuman et al. ................. 264/129 |
| 2006/0251803 | A1 * | 11/2006 | Huizinga et al. ............. 427/162 |
| 2009/0229745 | A1 * | 9/2009 | Lee et al. ................... 156/272.8 |
| 2010/0140830 | A1 * | 6/2010 | Perrone ....................... 264/153 |
| 2011/0033664 | A1 * | 2/2011 | Dicker et al. ................. 428/142 |

* cited by examiner

*Primary Examiner* — Dimple Bodawala
(74) *Attorney, Agent, or Firm* — Altis Law Group, Inc.

(57) ABSTRACT

A method for manufacturing an optical film includes providing a molding machine. The molding machine includes a hopper, a first cylindrical roller, a second cylindrical roller, and a UV light source. The first and second cylindrical rollers are located at two opposite sides of a narrow outlet of the hopper and positioned at substantially a same height just below the narrow outlet. Thereafter, a UV-curable material is provided into the hopper, and flows out from the narrow outlet of the hopper. The UV light source is turned on toward the UV-curable material. Furthermore, the first and second cylindrical rollers are rotated to directly press the UV-curable material when the UV-curable material is cured.

19 Claims, 6 Drawing Sheets

METHOD FOR FORMING OPTICAL FILM

CROSS-REFERENCE TO RELATED APPLICATION

The present application is a divisional application of U.S. patent application Ser. No. 12/975,247, filed on Dec. 21, 2010, which claims all benefits accruing under 35 U.S.C. §119 from TAIWAN 99122839, filed on Jul. 12, 2010, the contents of which are hereby incorporated by reference.

BACKGROUND

1. Technical Field

The disclosure relates to molds, and particularly to a molding machine for forming an optical film.

2. Description of the Related Art

A liquid crystal display usually includes a backlight module and an LCD panel located in front of the backlight module.

The backlight module is a light source for the LCD panel. The backlight module usually includes a light element, a light guide plate, and several optical films, such as prism sheets and diffusion films. Most optical films include a polyethylene terephthalate (PET) substrate and an ultraviolet (UV) curable resin layer having microstructures on surface to achieve specific features of the optical film, such as light focus or light diffusion. A method of manufacturing the optical film generally includes steps of: coating the PET substrate with UV-curable layer, forming microstructures on the UV-curable layer by roller imprinting, and an UV irradiation to cure the UV-curable layer.

However, light transmittance of the PET substrate is merely 90%, so 10% of light is lost before entering the UV-curable layer in operation. In addition, since the PET substrate and the UV-curable layer are formed by deferent machines and usually by deferent manufacturers, the cost of the PET substrates is considerable in the cost of the optical films. Moreover, since the PET substrate should be prepared before the coating process of the UV-curable layer, the delivery time of the optical films is apparently affected by the preparing of the PET substrates. The supplies of the PET substrates are running short, the delivery time of the optical films is delayed.

Therefore, it is desirable to provide a molding machine for forming an optical film, which can overcome the described limitations.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the present disclosure for forming an optical film. Moreover, in the drawings, like reference numerals designate corresponding parts throughout the views.

DETAILED DESCRIPTION

Embodiments of a molding machine for forming an optical film as disclosed are described in detail here with reference to the drawings.

Figure 1:
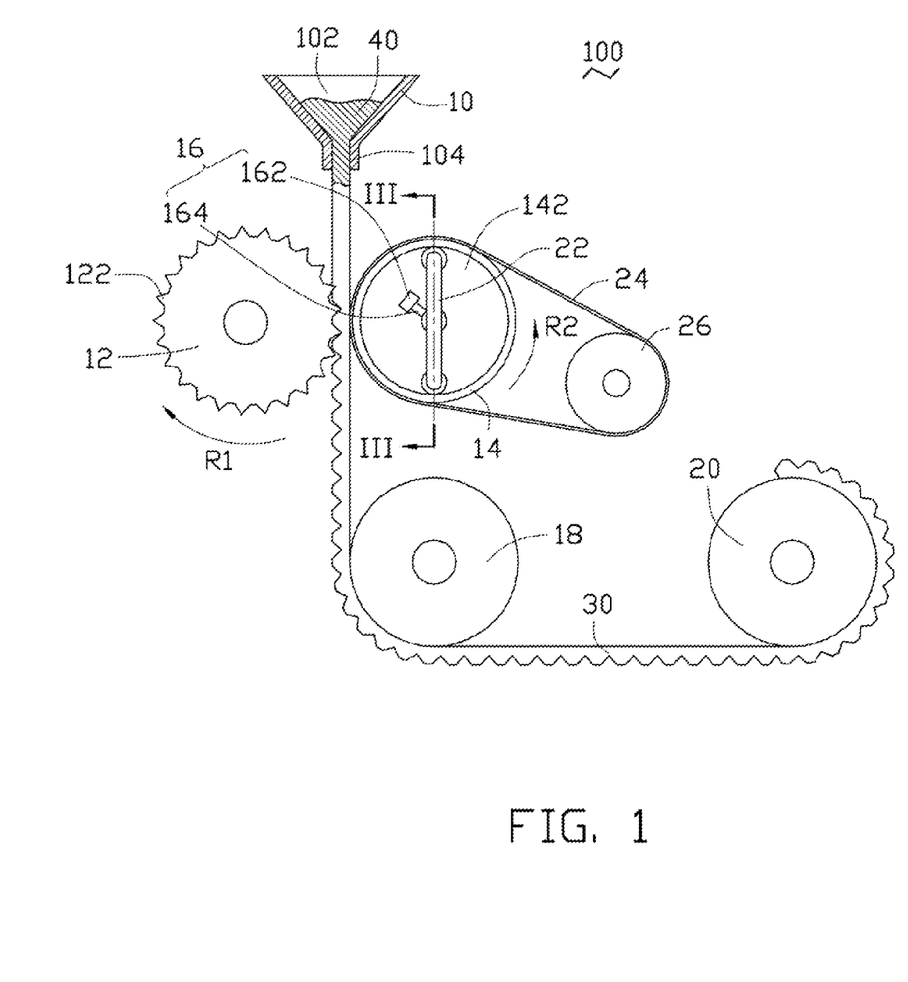
FIG. 1 is a cross section view of a molding machine in accordance with a first embodiment of the present disclosure.
Figure 2:
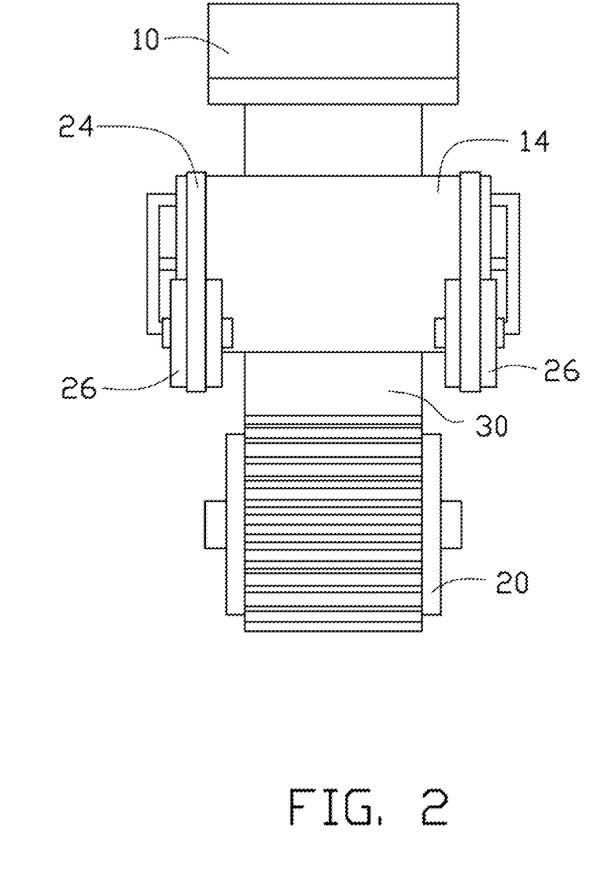
FIG. 2 is a schematic view of the molding machine from the right side of FIG. 1.
Figure 3:
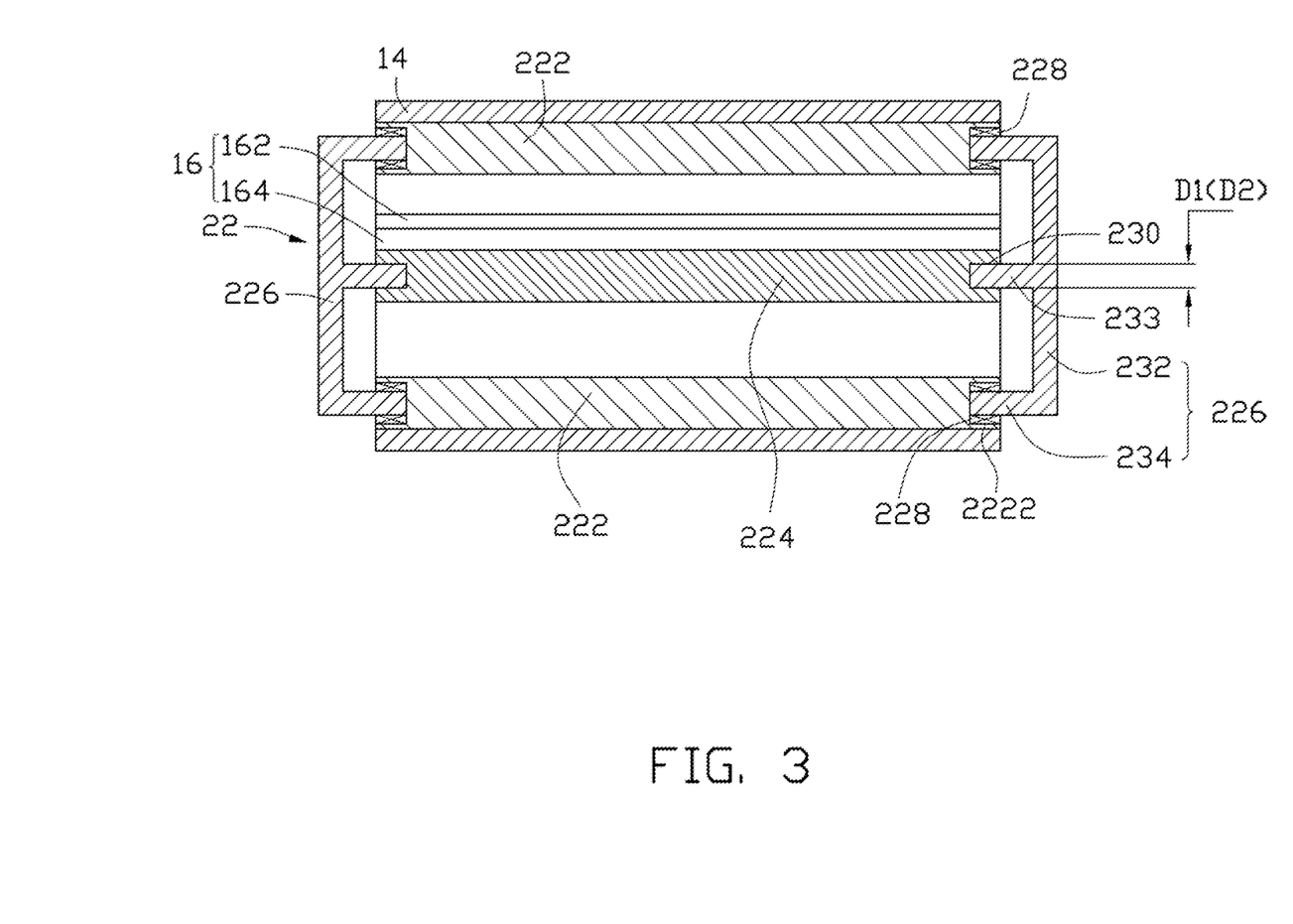
FIG. 3 is a cross section view of the molding machine along the cross line III-III of FIG. 1.

Referring to FIGS. 1 through 3, a first embodiment of a molding machine 100 for forming an optical film 30 includes a hopper 10, a first roller 12, a second roller 14, a UV light source 16, a guide pulley 18, a reel 20, a holder 22, two belts 24 and two actuators 26. The optical film 30 may be a prism sheet, a diffusion film, or any thin film composite, but is not limited thereto.

The hopper 10 is a narrow tank extending in a normal direction of the drawing paper of FIG. 1. The hopper 10 includes a conical inlet 102 and a narrow rectangular outlet 104 located opposite to the conical inlet 102, both the inlet 102 and the outlet 104 extend in the normal direction of FIG. 1. Thus, a cross section of the hopper 10 shown in FIG. 1 is a funnel. The hopper 10 provides a raw material of the optical film 30, such as a melt or malleable UV-curable resin 40. The UV-curable resin 40 is added into the hopper 10 from the inlet 102. The cross section in the hopper 10 gets smaller from the inlet 102 to the outlet 104, and then the UV-curable resin 40 flows out of the hopper 10 from the outlet 104. The hopper 10 can be opaque to prevent pre-curing of the UV-curable resin 40. For example, the hopper 10 may be made from metal.

The first roller 12 and the second roller 14 are located at two opposite sides below the outlet 104. The first roller 12 and the second roller 14 are cylindrical rollers. The first roller 12 is rotatable around a first central axis of the first roller 12 and the second roller 14 is rotatable around a second central axis of the second roller 14. Both the first central axis and the second central axis are substantially parallel to the hopper 10 and the outlet 104, and the first central axis and the second central axis are substantially parallel to each other at the same level. The first roller 12 and the second roller 14 define a gap therebetween to allow the UV-curable resin 40 to pass through. The width of the gap (the minimum distance between the first roller 12 and the second roller 14) is the predetermined thickness of the optical film 30.

The first roller 12 may be made form metal, such as copper. The first roller 12 defines a protruding microstructure 122 on the outer surface for imprinting a complementary microstructure on the optical film 30. In this embodiment, the microstructure 122 includes a plurality of prisms substantially parallel to the first central axis of the first roller 12.

The second roller 14 is a transparent hollow cylinder having a smooth outer surface. The second roller 14 may be quartz, or may include quartz and a self-assembled monolayer (SAM) covering the quartz to increase the smoothness. The second roller 14 defines a cylindrical hole 142. The second roller 14 is held by the holder 22, and is rotated by the belt 24 and the actuator 26.

As shown in FIG. 3, the holder 22 includes a central shaft 224 coaxial with the second central axis of the second roller 14, two rotatable shafts 222 located at two opposite sides of the central shaft 224, and two fixing units 226 connecting the central shaft 224 and the two rotatable shafts 222. The two rotatable shafts 222, the central shaft 224 and the second central axis of the second roller 14 are substantially parallel to each other. Each rotatable shaft 222 defines two first holes 2222 correspondingly at two terminals, and includes two bearings 228 in the two first holes 2222. The central shaft 224 defines two second holes 230 correspondingly at two terminals.

Each fixing unit 226 includes a middle shaft 233 connecting the central shaft 224, two periphery shafts 234 correspondingly connecting the two rotatable shafts 222, and a cross shaft 232 connecting the middle shaft 233 and the two periphery shafts 234. The middle shaft 233, the two periphery shafts 234 and the second central axis of the second roller 14 are substantially parallel to each other, and the cross shaft 232 is perpendicular to the middle shaft 233 and the two periphery shafts 234. In operation of the molding machine 100, positions of the two fixing units 226 are fixed relative to the hopper 10. For example, the two fixing units 226 may be held by other elements of the molding machine 100.

The two periphery shafts 234 of the each fixing unit 226 are correspondingly inserted into the two bearings 228 of the two rotatable shafts 222, and the middle shaft 233 of each fixing unit 226 is inserted into one second hole 230 of the central shaft 224. The middle shafts 233 are cylindrical shafts having a diameter D2, and the second holes 230 are cylindrical holes having a diameter D1 substantially identical with the diameter D2, so sufficient friction is provide between the central shaft 224 and the middle shafts 233.

The two rotatable shafts 222 are contained in the cylindrical hole 142 of the second roller 14, and outer surfaces of the two rotatable shafts 222 contact an inner surface of the second roller 14. The central axes of the two rotatable shafts 222 and the central axis of the second roller 14 are coplanar. Each belt 24 is a closed ring. The two belts 24 correspondingly catch two opposite terminals of the second roller 14. The two actuators 26 correspondingly drive the two belts 24, so the two belts 24 can rotate the second roller 14, and the two rotatable shafts 222 rotate around the central axis of the central shaft 224. The width of the belts 24 is much less than that of the second roller 14, so the belts 24 do not hinder the second roller 14 from imprinting. Numbers of the belts 24 and the actuator 26 are not limited to this embodiment.

The UV light source 16 may include a light bar 162 substantially parallel to the outlet 104 of the hopper 10, and a connection plate 164 connecting the light bar 162 and the central shaft 224. The light bar 162 and the central shaft 224 are fixed at two opposite sides of the connection plate 164. The light bar 162 and the connection plate 164 extend lengthwise along the central shaft 224, the length of the light bar 162 may be equal to or greater then the length of the outlet 104 lengthwise along the outlet 104. The position and shape of the UV light source 16 is not limited by this embodiment. Any position and shape of the UV light source 16 can be used to cure the UV-curable resin 40.

An emission direction of the UV light source 16 is orientated toward a space between the outlet 104 of the hopper 10 and the second roller 14 to cure the UV-curable resin 40 flowing out from the outlet 104. The connection plate 164 is retractable along a direction perpendicular to the outlet 104, so the distance between the UV light source 16 and the UV-curable resin 40 are adjustable.

Since both the middle shafts 233 and the second holes 230 are cylindrical, the central shaft 224 is rotatable around the central axis of the central shaft 224 relative to the middle shaft 233. Thus, the emission direction of the UV light source 16 is adjustable through rotation of the central shaft 224. When no additional force is applied to drive the central shaft 224, the sufficient friction between the central shaft 224 and the middle shaft 233 can steady the emission direction of the UV light source 16.

The guide pulley 18 may be cylindrical. The guide pulley 18 is located below the second roller 14 to guide the optical film toward the reel 20. Thus, the optical film 30 transmitted from the first roller 12 and the second roller 14 is protected from deformation. The central axis of the guide pulley 18 parallels the outlet 104 and the first roller 12, and the guide pulley 18 is rotatable around its central axis.

The reel 20 is located to one side of the guide pulley 18 to reel in the formed optical film 30. Thus, allowing easy transportation of the formed optical film 30. The reel 20 may also be cylindrical. The central axis of the reel 20 is substantially parallel to the outlet 104 and the first roller 12, and the reel 20 is rotatable around its central axis.

In preparation of the formation of the optical film 30, the hopper 10, the first roller 12, the holder 22, the actuators 26, the guide pulley 18, and the reel 20 are set in the molding machine 100. The emission direction of the UV light source 16 is adjusted toward the space between the outlet 104 of the hopper 10 and the second roller 14. An actuator (not shown) can roll the first roller 12 along a clockwise direction R1 shown in FIG. 1. The belts 24 are driven by the actuators 26 and the friction between the belts 24 and the second roller 14 rolls the second roller 14 around the second central axis of the second roller 14 along a counterclockwise direction R2 shown in FIG. 1.

As shown in FIG. 1 through FIG. 3, one embodiment of a method for manufacturing an optical film 30 includes the following steps.

First, the molding machine 100 is provided. The UV-curable resin 40 is added into the hopper 10 from the inlet 102. Thereafter, the UV-curable resin 40 flows out from the outlet 104 of the hopper 10, toward the gap between the first roller 12 and the second roller 14.

Substantially, the first roller 12 is rolled along the clockwise direction R1; and the second roller 14 is rolled along the counterclockwise direction R2 shown in FIG. 1. The UV light source 16 is turned on to irradiate toward the UV-curable resin 40 flowing out from the outlet 104. The UV-curable resin 40 irradiated by UV is cured. Just as portions of the UV-curable resin 40 are solidified, the first roller 12 and the second roller 14 imprints the portions of the UV-curable resin 40. One side of the UV-curable resin 40 is stamped with the microstructures 122 defined on the outer surface of the first roller 12, and another side of the UV-curable resin 40 is pressed by the smooth surface of the second roller 14. Thus, the optical film 30 has the complementary microstructures on one side and a smooth surface on another side.

The optical film 30 gets longer as the molding machine 100 keeps working The initial terminal of the optical film 30 can be guided to lean against the guide pulley 18 and can be fixed on the reel 20. When the reel 20 keeps rolling, the reel 20 reels in one surface of the optical film 30 contacts portions of the guide pulley 18, and the formed optical film 30. The drive force of the reel 20 is controlled under a predetermined strength to protect the optical film 30 from cracking.

Figure 4:
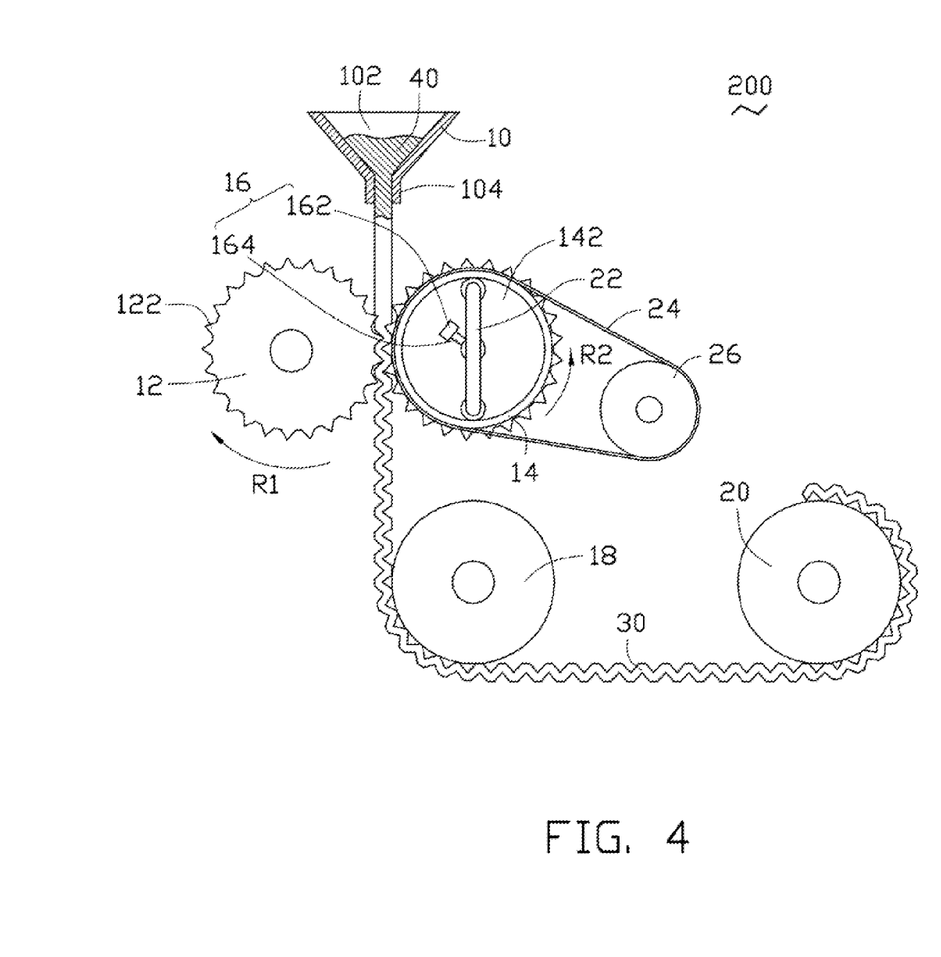
FIG. 4 is a cross section view of a molding machine in accordance with a second embodiment of the present disclosure.

As shown in FIG. 4, a second embodiment of a molding machine 200 is similar to the first embodiment of the molding machine 100 of FIGS. 1 through 3, except that the second roller 14 may also define microstructures on the surface for example by lithography technology. In such a case, the two opposite surfaces of the optical film 30 can have microstructures on the surface.

Figure 5:
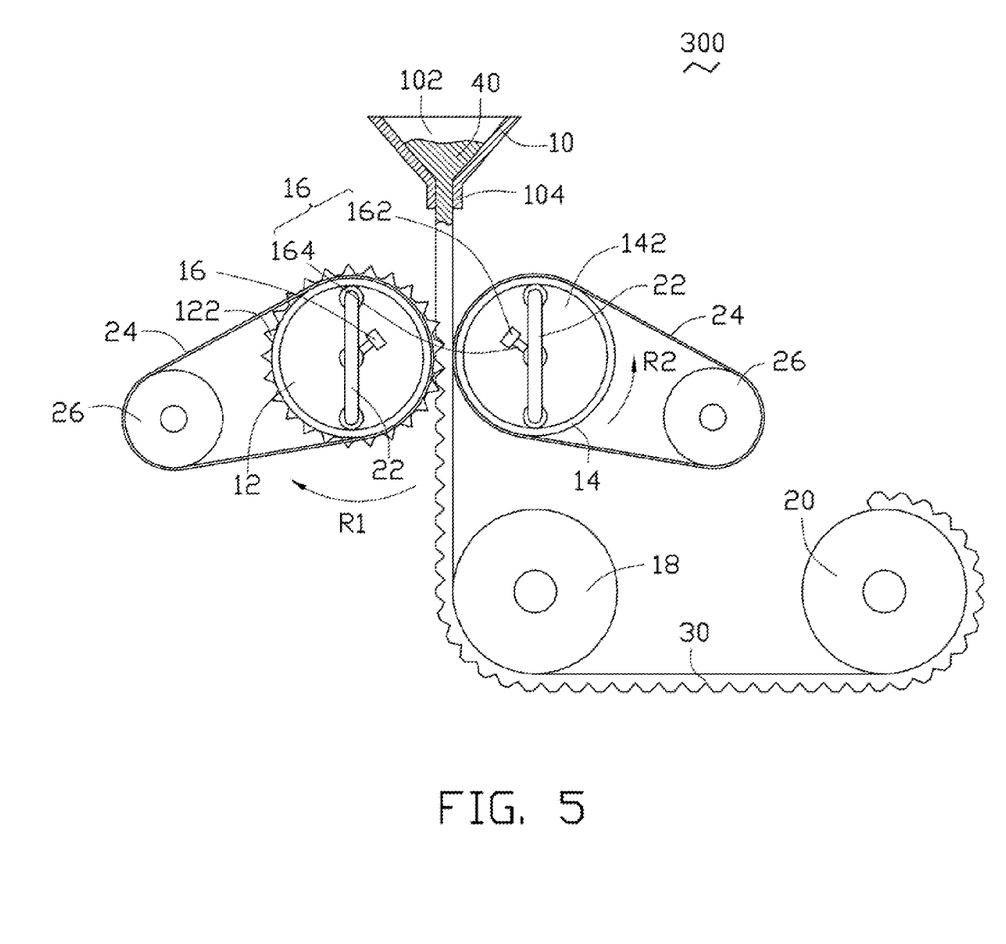
FIG. 5 is a cross section view of a molding machine in accordance with a third embodiment of the present disclosure.

As shown in FIG. 5, a third embodiment of a molding machine 300 is similar to the first embodiment of the molding machine 100 of FIGS. 1 through 3, except that the first roller 12 may have a similar structure with the second roller 14. The first roller 12 may be a transparent hollow cylinder, may be quartz or quartz with a SAM, may contain the UV light source 16, may be held by the holder 22, or may be driven by the actuators 26 and belts 24.

The positions of the first roller 12 and the second roller 14 are designed to allow the optical film 30 to move vertically, and are not limited by the drawings. For example, the guide pulley 18 may be located below the first roller 12.

Figure 6:
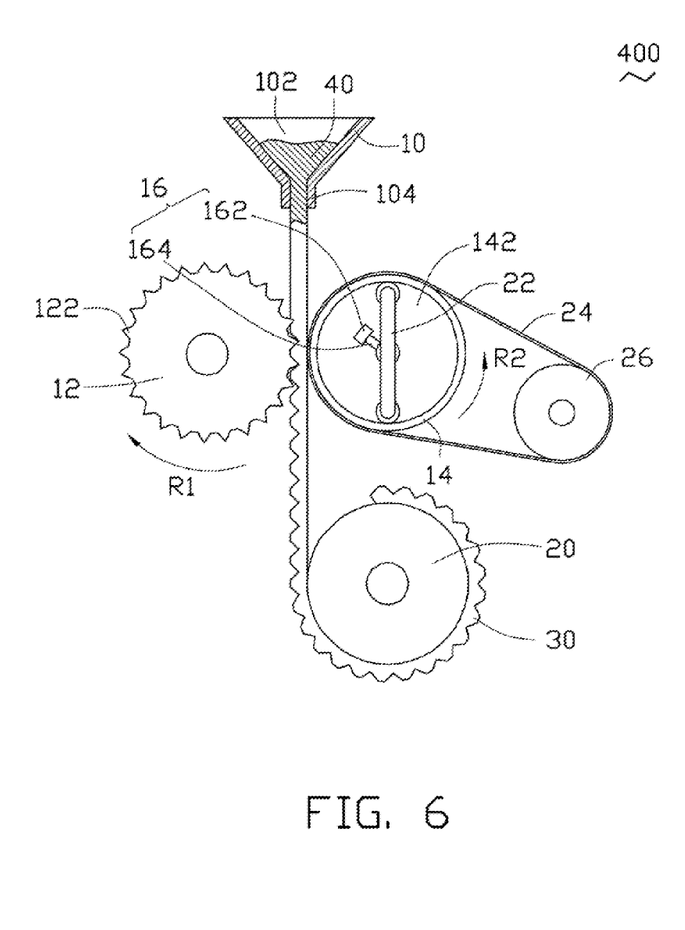
FIG. 6 is a cross section view of a molding machine in accordance with a fourth embodiment of the present disclosure.

As shown in FIG. 6, a fourth embodiment of a molding machine 400 is similar to the first embodiment of the molding machine 100 of FIGS. 1 through 3, except that the guide pulley 18 may be omitted, and the reel 20 may be located below the second roller 14 or the first roller 12 to directly reel in the formed optical film 30.

The molding machine and method for forming the optical film omit the PET substrate. Thus, light transmittance of the optical film is improved, and the cost and time of forming optical film is decreased.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing an optical film, comprising: providing a molding machine, the molding machine comprising:
   a hopper contoured to provide an UV-curable material of the optical film and defining a narrow outlet:
   a first cylindrical roller rotatable about a first central axis of the first cylindrical roller;
   a second cylindrical roller rotatable about a second central axis of the second roller, wherein the first central axis is in parallel with the second central axis; the first and second cylindrical rollers are located at two opposite sides of the narrow outlet and positioned at substantially a same height below the narrow outlet, wherein a gap between the first and second cylindrical rollers allows the raw material to pass through the gap;
   an ultraviolet (UV) light source located in the second cylindrical roller, wherein an emission direction of the ultraviolet light source is orientated toward a space between the narrow outlet and the second cylindrical roller; and
   a holder contoured to hold the second cylindrical roller, the holder comprising:
      a central shaft coaxial with the second cylindrical roller, wherein the UV light source is connected to the central shaft;
      two rotatable shafts located at two opposite sides of the central shaft and paralleling the central shaft, outer surfaces of the two rotatable shafts contacting an inner surface of the second cylindrical roller; and
      at least one fixing unit connecting the central shaft and the two rotatable shafts;
   providing the UV-curable material into the hopper, and the UV-curable material flowing downward from the narrow outlet of the hopper;
   turning on the UV light source toward the UV-curable material flowing downward from the narrow outlet to cure the UV-curable material; and
   rotating the first and second cylindrical rollers to directly press the UV-curable material without pre-coating the UV-curable material on a solid substrate when the UV-curable material is cured.

2. The method of claim 1, wherein both the first and second cylindrical rollers contact the UV-curable material.

3. The method of claim 1, wherein the UV-curable material flows out from the narrow outlet of the hopper toward the gap between the first and second cylindrical rollers, and the gap is located just below the narrow outlet.

4. The method of claim 1, wherein the first cylindrical roller is rolled along a clockwise direction, and the second cylindrical roller is rolled along a counterclockwise direction.

5. The method of claim 1, wherein the first and second cylindrical rollers imprint a portion of the UV-curable material that are solidified by UV light of the UV light source.

6. The method of claim 1, wherein a first side of the UV-curable material is stamped by a plurality of microstructures defined on an outer surface of the first cylindrical roller.

7. The method of claim 6, wherein a second side of the UV-curable material is pressed by a smooth surface of the second cylindrical roller.

8. The method of claim 1, wherein the molding machine further comprises a reel parallels the narrow outlet, and the method further comprises reeling in the optical film by the reel.

9. The method of claim 8, wherein the molding machine further comprises a guide pulley located below one of the first and second cylindrical rollers, and the method further comprises guiding the optical film toward the reel.

10. The method of claim 1, wherein the first cylindrical roller defines a first microstructure, the second cylindrical roller defines a first microstructure and a second microstructure, and the step of rotating the first and second cylindrical rollers forms a first complementary microstructure and a second complementary microstructure on the optical film.

11. The method of claim 1, wherein the molding machine further comprises a holder to hold the second cylindrical roller.

12. The method of claim 11, wherein the ultraviolet light source is fixed on the holder.

13. The method of claim 12, wherein
the ultraviolet light source is ositioned between one of the two rotatable shafts and the central shaft.

14. The method of claim 1, wherein the central shaft and the two rotatable shafts are rotatable around a central axis of the central shaft.

15. The method of claim 1, wherein the at least one fixing unit comprises:
   a middle shaft connecting the contra shaft;
   two periphery shafts connecting the two rotatable shafts: and
   a cross shaft connecting the middle shaft and the two periphery shafts.

16. The method of claim 15, wherein the middle shaft, the two periphery shafts and the second central axis of the second roller are parallel to each other, and the cross shaft is perpendicular to the middle shaft 17. The method of claim 15, wherein a position of the at least one fixing unit is fixed relative to the hopper.

18. The method of claim 15, wherein each of the two rotatable shafts comprises at least one bearing contoured to hold the two periphery shafts of the at least one fixing unit.

19. The method of claim 15, wherein the central shaft defines at least one hole, and the middle shaft of the at least one fixing unit is inserted in the at least one hole of the central shaft.

* * * * *